United States Patent
Slaughter

(10) Patent No.: US 9,896,142 B2
(45) Date of Patent: Feb. 20, 2018

(54) DYNAMIC CYCLE LIGHT DISTRIBUTION SYSTEM

(71) Applicant: Christopher Slaughter, Littleton, CO (US)

(72) Inventor: Christopher Slaughter, Littleton, CO (US)

(73) Assignee: MYSTIC DEVICES, LLC, Littleton, CO (US)

( * ) Notice: Subject to any disclaimer, the term of this patent is extended or adjusted under 35 U.S.C. 154(b) by 0 days.

(21) Appl. No.: 15/434,130

(22) Filed: Feb. 16, 2017

(65) Prior Publication Data

US 2017/0158273 A1 Jun. 8, 2017

Related U.S. Application Data

(63) Continuation of application No. 15/015,097, filed on Feb. 3, 2016, now Pat. No. 9,630,669.

(60) Provisional application No. 62/111,885, filed on Feb. 4, 2015.

(51) Int. Cl.
| | |
|---|---|
| *B62J 6/00* | (2006.01) |
| *B62J 6/02* | (2006.01) |
| *H05B 33/08* | (2006.01) |
| *B60Q 1/14* | (2006.01) |
| *B62J 99/00* | (2009.01) |

(52) U.S. Cl.
CPC ............. *B62J 6/001* (2013.01); *B60Q 1/143* (2013.01); *B62J 6/02* (2013.01); *H05B 33/0842* (2013.01); *H05B 33/0845* (2013.01); *B62J 2099/0026* (2013.01); *B62K 2207/02* (2013.01); *B62K 2207/04* (2013.01)

(58) Field of Classification Search
CPC . B60Q 1/387; B60Q 1/38; B60Q 1/34; B60Q 11/007; B60Q 1/44; B60Q 1/40; B60Q 1/382; B60Q 1/343
USPC ...................... 353/11–13; 340/432, 475, 477
See application file for complete search history.

(56) References Cited

U.S. PATENT DOCUMENTS

| | | | |
|---|---|---|---|
| 5,608,392 | A | 3/1997 | Faivre et al. |
| 5,921,669 | A | 7/1999 | Taylor et al. |
| 8,007,408 | B1 | 8/2011 | Moran et al. |
| 8,325,027 | B2 | 12/2012 | Tee et al. |
| 2010/0123402 | A1 | 5/2010 | Chen |
| 2010/0238016 | A1 | 9/2010 | Singh |
| 2010/0283590 | A1 | 11/2010 | Tee et al. |

(Continued)

FOREIGN PATENT DOCUMENTS

| | | |
|---|---|---|
| CN | 103419713 | 12/2013 |
| WO | WO2013186685 | 12/2013 |

OTHER PUBLICATIONS

Notification of Transmittal of the International Search Report and the Written Opinion of the International Searching Authority, PCT/US2016016474, dated Apr. 11, 2016, p. 1-15.

*Primary Examiner* — Minh D A
(74) *Attorney, Agent, or Firm* — Braxton, Hilton & Perrone, PLLC

(57) ABSTRACT

A system for dynamic distribution of bicycle lighting including a plurality of light sources coupled to and under operation of a controller. The controller controls power distributed to the light sources and provides dynamic illumination of the light sources according to bicycle operating condition data, regarding the speed, angle of incline, angle of descent and geographic and terrain conditions in which the bicycle is operated.

23 Claims, 8 Drawing Sheets

(56) References Cited

U.S. PATENT DOCUMENTS

| | | |
|---|---|---|
| 2012/0096978 A1 | 4/2012 | Voshell et al. |
| 2012/0203431 A1 | 8/2012 | Lukacs et al. |
| 2012/0243245 A1 | 9/2012 | Smith et al. |
| 2013/0176747 A1 | 7/2013 | Sparrow |
| 2013/0307411 A1 | 11/2013 | Tsuchia |
| 2013/0307678 A1 | 11/2013 | Ransom |
| 2014/0320829 A1 | 10/2014 | Woltman et al. |
| 2016/0221625 A1* | 8/2016 | Slaughter ................. B62J 6/001 |

* cited by examiner

DYNAMIC CYCLE LIGHT DISTRIBUTION SYSTEM

This application is a continuation of and claims the benefit of priority to U.S. application Ser. No. 15/015,097 filed Feb. 3, 2016 which claimed the benefit of priority to U.S. Provisional Patent Application No. 62/111,885 filed Feb. 4, 2015, both of which are incorporated herein by reference.

TECHNICAL FIELD

This disclosure relates generally to a vehicle lighting system and apparatus that provides efficient and directed lighting according to the velocity, direction and environmental conditions of the associated vehicle. The system and apparatus disclosed herein employs pulse width modulation (PWM) signal processing techniques to effectively distribute power at various levels to several light sources, such as light emitting diodes (LEDs) according to various parameters.

DESCRIPTION OF RELATED ART

Proper lighting of the path of travel of a vehicle, such as a bicycle, is vital in terms of the quality of the rider's experience and rider visibility and safety. Various manufacturers of bicycle lighting systems have offered a number of lighting solutions. These systems range from crude single bulb lighting systems that operate at a constant level and illuminate a fixed area to more sophisticated systems. The presently disclosed PWM Luminous Distribution Modification System provides a novel advance in vehicle lighting. The present system incorporates PWM techniques to distribute a desired level of power to a plurality of LEDs situated on the vehicle according to various operator parameters and the environmental conditions.

BRIEF DESCRIPTION OF THE DRAWINGS

The novel features believed characteristic of the invention are set forth in the appended claims. Several embodiments of the invention will now be described with reference to the drawings. The invention itself, however, as well as further objectives and advantages thereof, will be best understood by reference to the following detailed description of illustrative embodiments when read in conjunction with the accompanying drawings. The invention illustratively disclosed herein suitably may be practiced in the absence of any element which is not specifically disclosed herein.

DETAILED DESCRIPTION

Figure 1:
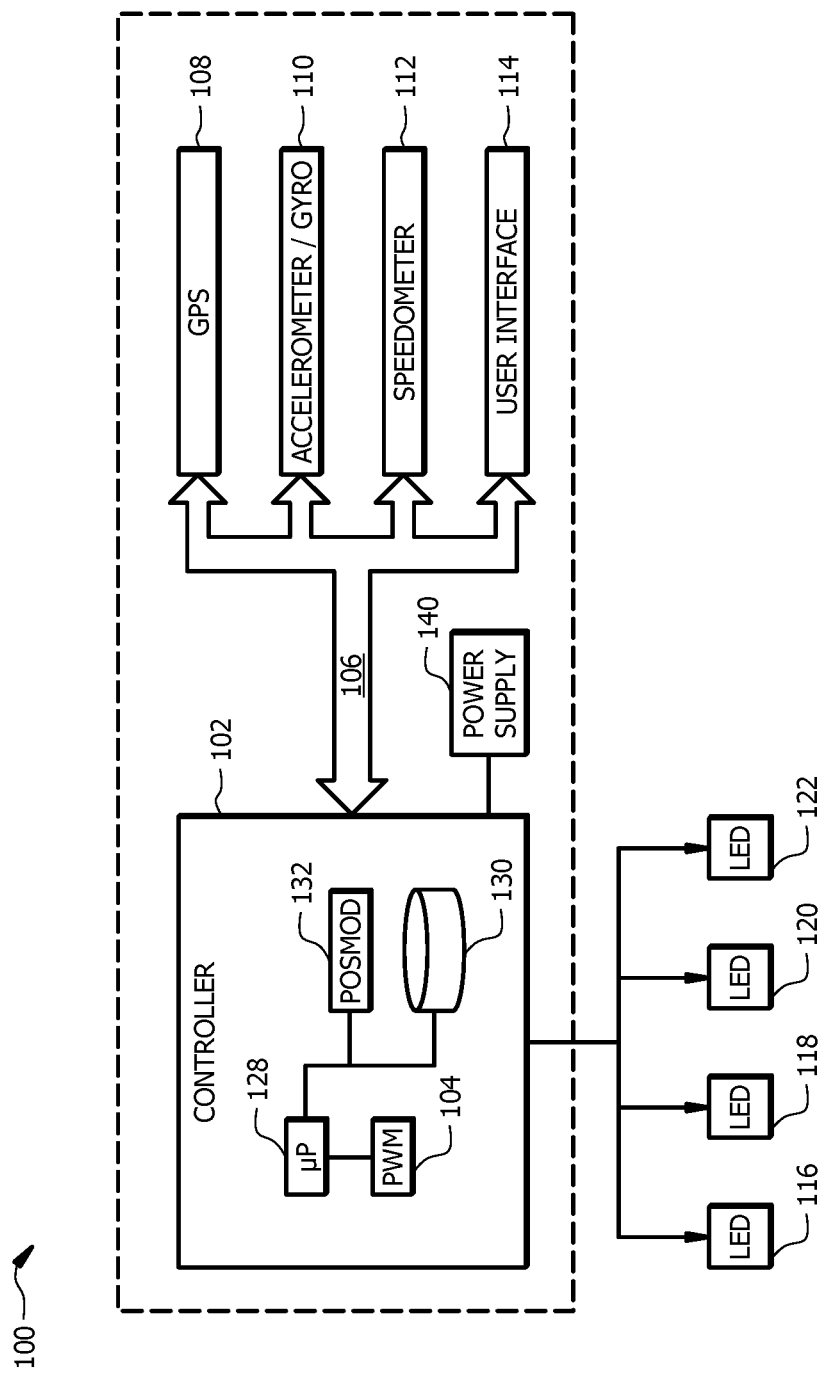
FIG. 1 is block diagram of an embodiment of the present dynamic cycle light distribution system.

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

A Pulse Width Modulation (PWM) Signal is a method for generating an analog signal using a digital source. A PWM signal consists of two main components that define its behavior: a duty cycle and a frequency. The duty cycle describes the amount of time the signal is in a high (on) state as a percentage of the total time of it takes to complete one cycle. The frequency determines how fast the PWM completes a cycle (i.e. 1000 Hz would be 1000 cycles per second), and therefore how fast it switches between high and low states. By cycling a digital signal off and on at a fast enough rate, and with a certain duty cycle, the output will appear to behave like a constant voltage analog signal when providing power to devices.

For example, to generate a 4V signal given a digital source that can be either high (on) at 5 volts (V) or low (off) at 0V, PWM with a duty cycle of 80% will provide 5V 80% of the time. If the digital signal is cycled fast enough, then the voltage seen at the output appears to be the average voltage. The low voltage is typically 0V, making the average voltage can be calculated by taking the digital high voltage multiplied by the duty cycle, or 5V×0.8=4V. Selecting a duty cycle of 80% would yield 4V, 20% would yield 1V, and so on. The PWM duty cycle and high and low voltages for the present disclosure are, therefore, set to drive the LEDs as desired.

With the advancements in white LED (solid-state technology), lights in many sectors of the human environment are being replaced by LEDs. LEDs have been incorporated into bicycles. Existing technologies, such as halogen lamps, are sensitive to vibration resulting from road or path conditions causing damage to the lamps filament. Such sensitivity makes halogen or similar lighting undesirable. Other efficient lighting, such as HID lighting requires expensive ballasts to provide the proper voltage to start and maintain a plasma arc inside of the bulb. HID lighting, therefore, is not a cost efficient alternative. LEDs, on the other hand, are not sensitive to vibration and the level of output may be easily controlled. LEDs can be driven easily with direct current or PWM solid state circuits.

Presently employed bicycle lighting configurations include the use of LEDs. Typically, products incorporating LEDs are relatively expensive, yet are limited in functionality. Generally, lighting products that incorporate LED technology may include a single LED or multiple LEDs. These LED arrangements as well as headlamp arrangements may be driven by the same of different power distributions. The multiple LEDs, however, do not operate in tandem according to a modulated power distribution technique as described herein. In multiple headlamp or LED systems, the objective of powering the various light sources to produce different levels is to preserve battery life, not provide a customize and dynamic distributed output aimed at achieving optimal performance in terms of bicycle operation and safety.

During bicycle operation, terrain varies. For example, a bike trail may curve or be sloped. While riding, however, the angle of the bicycle in relation to the geometry of the terrain may not coincide. Accordingly, the direction and amplitude of lighting sources affixed to a bicycle may not provide sufficient lighting according to the position of the bicycle relative to the path. In motor vehicles, a highly regulated industry, the position of the car in relation to the road is highly predictable. As such, the slope and curvature radius of headlamps must fall within certain ranges.

For bicycles, on the other hand, various components of the bicycle and the associated lighting may be placed at irregular angles and positions depending upon speed and terrain. For example, when a right hand corner turn is made at very slow speed, the bike's handlebars are dramatically turned towards the turn. At higher speeds on a relatively straight yet somewhat curved track, the amount of the handlebar turn is less dramatic, to the point where the displacement of the handlebars during a gradual turn at high speed is nearly zero. But at higher speeds when the path is highly curved, handlebar rotation may or may not be necessary to navigate the curves, yet traditional static lighting causes illumination in a direction other than where the bicycle is headed. In other words, the area illuminated by the direction of the light is not necessarily the direction of interest as the cyclist is travelling in a curved path. Thus, areas ahead on the path are not illuminated. This is a problem for the exposed cyclist as no indication is given of obstacles or other hazards close ahead. This phenomenon exists for road biking (including motorcycling) as well as mountain biking. There is a need, therefore, for a dynamic power distribution system to modify the level of lighting emitted from multiple sources operating in tandem. Such a system illuminates the area where the bicycle or motorcycle operator needs it at all times, regardless of speed, bike lean angle, acceleration or angle of approach. This angle of approach, or zenith angle, refers to the angle of the bicycle in relation to vertical. For example, on a flat surface, the bicycle's zenith angle direction of travel is 90 degrees (the y-axis of the bicycle is perpendicular to the surface).

Equipping the cyclist with an additional lamp, such as a headlamp, is not an efficient or cost effective solution. A headlamp is an additional piece of equipment that comes at a cost and must have an associated power source.

The presently disclosed system incorporates various technologies to provide a dynamic distributed lighting system. Technology in solid state devices has advanced in recent years and various components may be inexpensively obtained. In addition, accelerometer and gyroscope chips (such as a capacitive micro electro-mechanical systems (MEMS) chip) are widely available. These chips determine the zenith angle (angle of approach or pitch angle), cycle lean (roll) and acceleration available according to a 3-axis protocol. Moreover, bicycle speed can be measured according to tire revolutions or through Global Positioning System (GPS) technology. GPS technology can also provide information related to the topography of a particular area, or rate of ascent or descent.

An additional concern is light flicker. Users desire a virtual steady light as opposed to a flickering light, the latter being a potential distraction to motorists and providing less effective illumination. PWM chips can efficiently drive a single or multiple LED chips with frequencies sufficient to make LED flicker virtually unnoticeable.

According to an embodiment of the present system, multiple channels of LEDs are driven at varying percentages to create a dynamic adaptive lighting distribution environment. Unlike other technologies in which lighting housing is rotated based on vehicle direction or conditions, the present system relies on distribution of positioned LEDs rather than mechanical moving parts that encounter mechanical or electrical failure, are expensive to manufacture and occupy valuable space within the vehicle.

The embodiments of the present system utilize real-time feedback data including but not limited to cycle speed, acceleration, GPS data, traveling zenith angle (approach angle), tilt and roll of a bicycle or motor bike rider. This data is used to create an apparent luminous distribution which is adaptive to current riding conditions (on road or trail) and intuitive to the rider to assist the rider in viewing the path ahead. The data may come from one or more sensors located in a singular housing or at multiple locations on the vehicle. Use of multiple LEDs sources driven by distributed power using PWM techniques provides a dynamic LED system that accommodates real travel conditions.

In the embodiments of the present system, different LED and optic combinations are employed for different purposes, yet powered by the same source, such as a battery or set of batteries located internally to a device or remotely on the vehicle. LEDs are situated at numerous locations on the bicycle. Multiple LEDs may reside in a single housing unit, in multiple housing units or individually at various locations on the bicycle. Depending on the road conditions, speed of travel and topography, the LEDs will be activated and powered according to data received by an associated controller. It is contemplated that a plethora of light sources, such as LEDs, may be situated on the bicycle to operate according to the present invention.

In some applications of the presently disclosed system, different LEDs may be used for different functions. For example, for street bike use, when a rider is in a location travelled by motor vehicles an LED may be situated in an above the horizon location to notify pedestrians and drivers of an oncoming cyclist. At the same time, other LEDs situated to provide illumination of the path of travel are driven by the controller according to conditions, terrain topography, speed, zenith angle and other variables as described above. Thus, a combination of different LEDs having different optical types (elliptical, narrow symmetrical, wide symmetrical and other non-symmetrical types) are employed to create a total drive distribution that changes according to input data as described. These various optical types that are positioned to illuminate an area at different angles and distances are powered as a function of condition data using to PWM techniques.

In another example, in a mountain biking context the distributed LED configuration accommodates a variety of complex variables not found in a street cycling setting. For example, the bike of a mountain biker on a slow descent may have a steep zenith angle (cycle pointing down sharply on descent). In this context, the rider may lean back for optimal balance. As such, the rider would require lighting on a relatively horizontal plane in reference to the vertical axis of the bicycle rather than pointing down to the trail to provide the rider with a broad view as to what is ahead. On the other hand, on a slow technical ascent, the rider is in need of information near to the front of the bike in order to properly choose a path. At the same time, on a slow, steep ascent information concerning far ahead trail conditions have little meaning. Also, sharp handlebar turns of a mountain biker are more common than for a road bike. Thus, the system needs to take into account sharp, sporadic handlebar movement without unnecessarily altering illumination patterns.

The detailed description set forth below s intended as a description of the presently embodiments of the invention, and is not intended to represent the only form in which the present invention may be constructed or utilized. The description sets forth the functions and sequences of steps for constructing and operating the in s to be understood, however, that the same or equivalent functions and sequences may be accomplished by different embodiments and that they are also intended to be encompassed within the scope of the invention.

FIG. 1 is a block diagram of the presently disclosed dynamic cycle light distribution system. Distribution system 100 includes a controller 102 to control the operation of various LEDs 116, 118, 120 and 122 associated with a vehicle such as a bicycle. Associated with controller 102 is pulse width modulation circuitry 104. PWM circuitry may be comprised of a dedicated chip to provide the desired level of current to drive the LEDs at the desired level alone or in tandem.

Controller 102, which may be a microcontroller, is connected to various input data via data bus 106. Input data include GPS data transmitted by GPS device 108, signals received by accelerometer/gyroscope 110 that provides relevant positioning information, a speedometer 112 that provides cycle speed information and a user interface device 114 that allows transmission to controller 102 of user defined instructions, such as an override function, on/off function or custom tuning of specific LED activation function based on desired criteria. In operation, controller 102 drives LEDs 116, 118, 120 and 122 though PWM circuit 104 capabilities in a distributed manner according to input received by one or more of devices 108, 110, 112 and 114. Controller 102 includes a processor 128 and associated storage device 130 on which application programs that upon execution operate the described dynamic cycle light distribution system 100. Power supply 140, which may comprise one or more batteries and may reside within system 100 or remote from system 100 is also shown. Controller 102 may further comprise a position module 132 that aggregates or receives data from the various position or condition sensing devices 108, 110, 112 and 114 and may process and communicate the position or condition device data to processor 128, including converting such relevant signals as appropriate. These components of the presently described distribution system may reside in a singular location on the vehicle or at multiple locations. For example, MEMS chips could be positioned on a handlebar and frame of a bicycle simultaneously to be able to have comparative measurements of data for luminous distribution modification. Additionally, accelerometers could be mounted at forward and rearward locations on the vehicle to also perform comparative measurements such as sensing bumpy or rough terrain such as to lessen readings that would produce an incorrect distribution response. While FIG. 1 describes a system incorporating four LEDs, more complex embodiments are contemplated incorporating arrays or arrangements of as few as two or more than four LEDs are contemplated.

Figure 2:
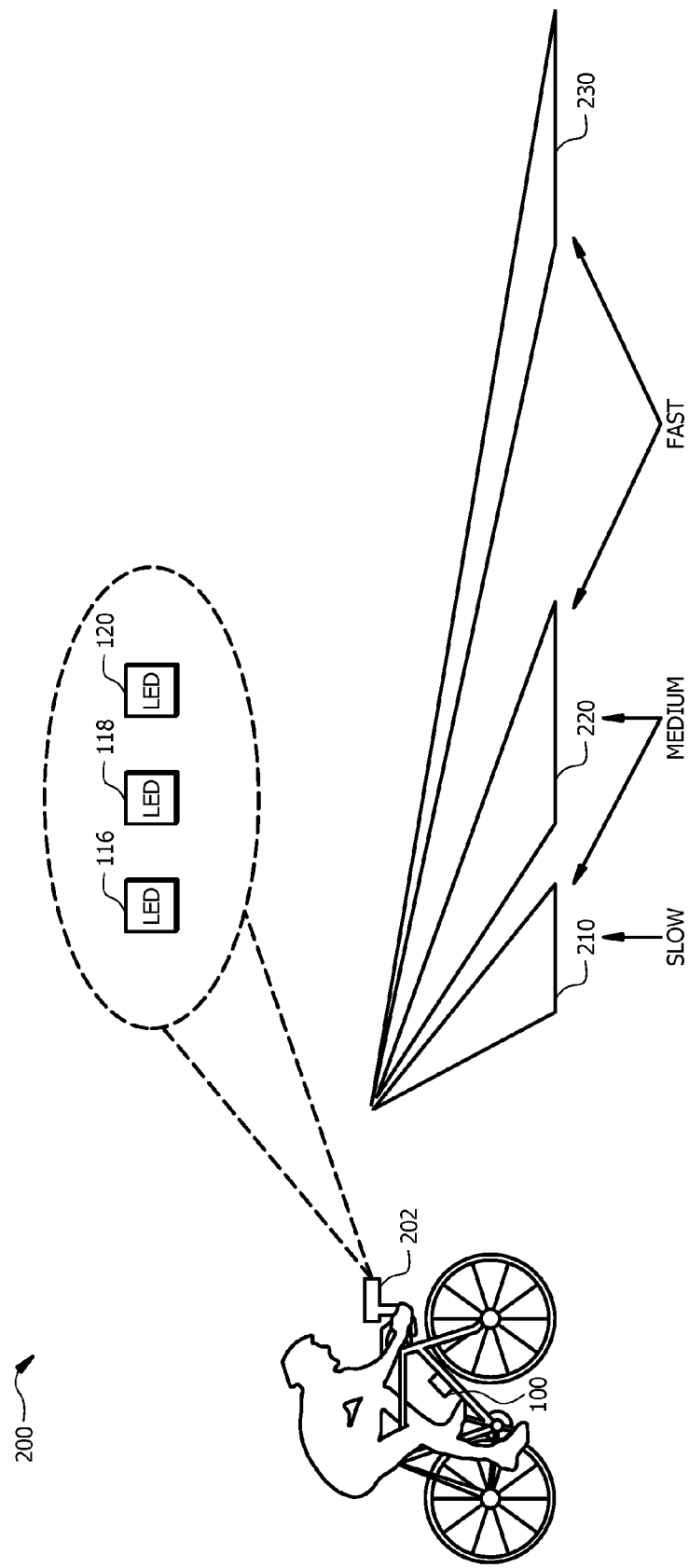
FIG. 2 is a diagram of an embodiment of the operation of the present dynamic cycle light distribution system.

Shown in FIG. 2 is an example of the dynamic distribution capability of one embodiment of the disclosed system. In this example, distribution system 100 including controller 102 is mounted on a bicycle 200. Associated with system 100 is an array 202 of LEDs. These LEDs are positioned so as to provide illumination at the front of the bicycle 200. In an embodiment a first LED 116 is positioned to provide light in a downward direction so as to illuminate an area 210 of a path ahead of bicycle 200. A second LED 118 is positioned in a downward direction so as to illuminate an area 220 of a path ahead of bicycle 200 and ahead of area 210 along the path. A third LED 120 is positioned in a downward direction so as to illuminate an area 230 of a path ahead of bicycle 200 and ahead of area 220 along the path to be traveled. Depending upon the speed, position or other variables, with information representing such conditions received by the controller 102, controller 102 drives an LED to illuminate an appropriate area.

In the example shown, at some slower speeds, LED 116 is driven to illuminate area 210. At increased speeds, LED 118 may be driven to illuminate area 220. At higher speeds, LED 120 may be driven to illuminate area 230. While FIG. 2 describes a system incorporating three LEDs, more complex embodiments are contemplated incorporating arrays or arrangements of as few as two or more than three LEDs arranged at a variety of locations on bicycle 200 or platform vehicle.

Moreover, multiple LEDs may be driven in tandem with power distributed across LEDs according to condition data received by the controller. The power is distributed among LEDs according to the PWM duty cycles. In the example shown in FIG. 2, at various travel speeds, multiple LEDs may be illuminated as the cyclist accelerates to a constant maximum speed. As shown, at a travel speed that may be considered "slow", only LED 116 may be driven to illuminate area 210. As speed increases, however, to a speed that may be considered "moderate", then power is distributed by controller 102 between LEDs 116 and 118 so as to illuminate an area encompassing part of area 210 and part of area 220. In this manner, changes in illumination are gradual as the user's speed increases. Once the cyclist arrives at a speed that may be deemed "medium", most of the power is dedicated to LED 118 with a small percentage dedicated to LED 116. In this manner, most of area 220 is brightly illuminated while area 210 is illuminated dimly.

Similarly, as the cyclist achieves more speed ("fast"), LED 116 may receive minimal or reduced power while LED 120 received the largest percentage of power while intermediate LED 118 is driven at a level lower than LED 120. In this manner, the forward area 230 is the most brightly illuminated region, area 220 is somewhat illuminated and area 210 is most dimly lit. As the speed of cycle 200 varies, the distribution of power to each LED also varies.

Figure 3:
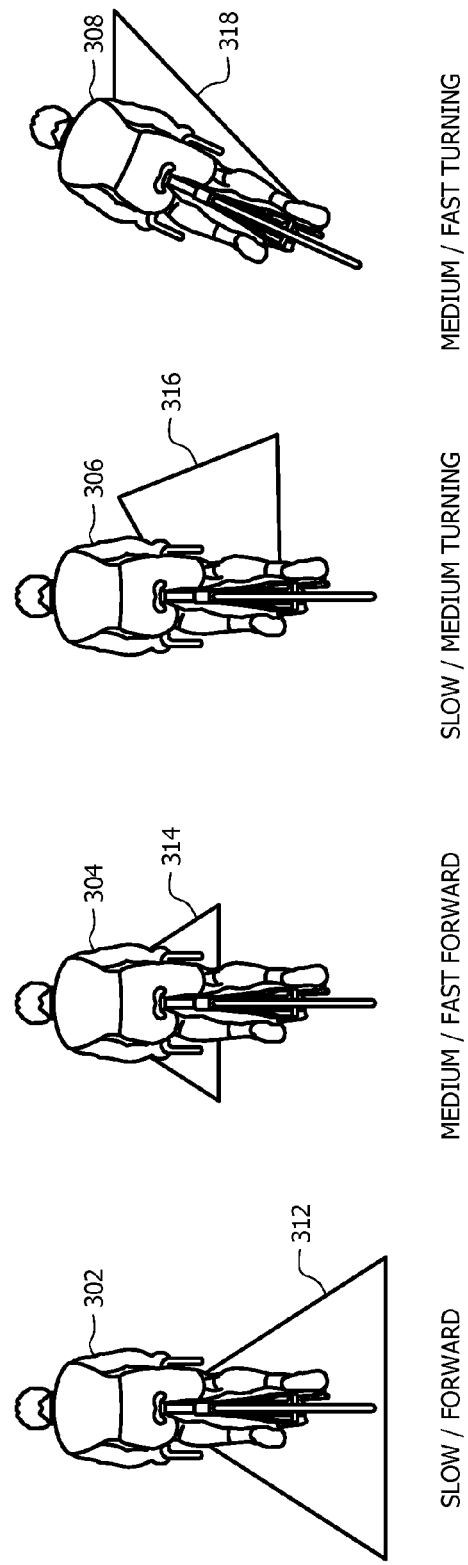
FIG. 3 is a diagram of an embodiment of the operation of the present dynamic cycle light distribution system.

In another embodiment, when controller 102 receives other positional signals, such as accelerometer data from accelerometer or gyroscope 110 as shown in FIG. 1, LEDs situated to illuminate areas laterally may be powered in a distributed manner similar to that described above. In FIG. 3, various examples are provided of a cyclist's position while traveling at various speeds. Cyclists 302 and 304 are traveling in a straight manner and LEDs will be driven in a distributed manner according to cycle speed as described above with respect to FIG. 2. As seen in FIG. 3, at slow speed (cyclist 302), light 312 is concentrated close to and in front of the cyclist as less time is necessary at slow speeds to avoid obstacles or make a turn of interest. This extent of lighting is achieved by driving primarily LED 116. At medium to fast speeds (cyclist 304), light 314 extends farther in front of the cyclist by driving primarily LED 118. At higher speeds, the cyclist is in need to see obstacles or turns sooner in order to react in time.

FIG. 3 also depicts cyclists turning at various speeds and the changing envelope of illumination associated with such turning. Cyclist 306, for example, is turning at slow speed. Nevertheless, the turning tends to alter the lean angle that is sensed by the accelerometer/gyroscope 110. Representative signals received by the controller from accelerometer 110 and speedometer 112 cause controller 102 to drive forward facing (forward or laterally aimed) LEDs as described above or other laterally placed or directed LEDs in tandem. Accordingly, depending on the speed of the cyclist and severity of the turn, an area in the direction of the turn in illuminated. As shown, an area 316 in close proximity to the front and right (turning direction) of the cyclist 306 is illuminated. Note that in this figure, it is assumed that the cycle is travelling on a nearly flat surface. Thus, the cycle has a zenith angle of travel of approximately 90 degrees. The lean angle, which is measured as the angle of the cycle displaced from vertical laterally increases in the direction of the turn as sharper turns are made. At higher speeds, the lean angle of the cyclist increases, as shown with respect to cyclist 308. At higher speed and a sharp turning angle, illumination to the turning side of the cyclist is more pronounced. This is achieved by the controller distributing power to LEDs situated to provide remote illumination, such as LED 120 described above and similarly angled LEDs positioned laterally on the bicycle. In this manner, controller distributes power to the LEDs according to both speed and turning direction of the bicycle.

Figure 5A:
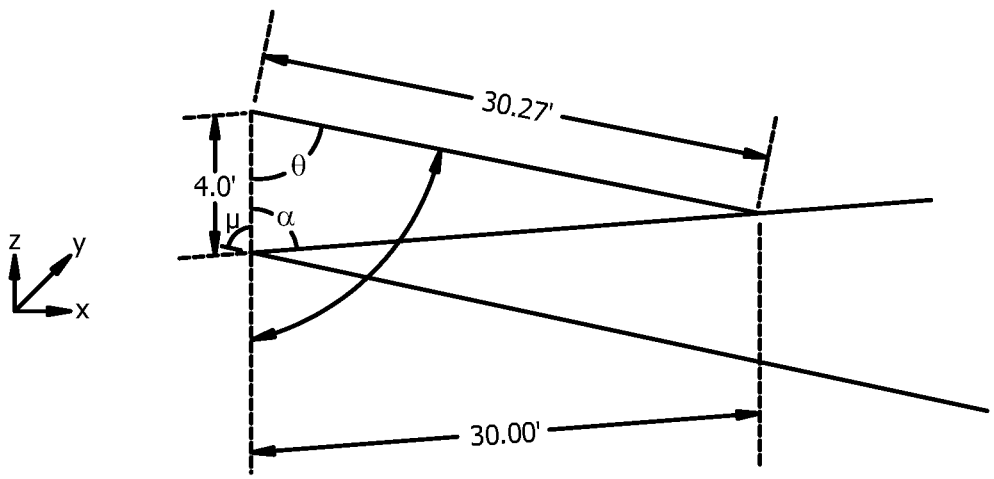
FIG. 5A is a diagram of a light source illumination path according to a first operating condition of an embodiment of the present dynamic cycle light distribution system.
Figure 5B:
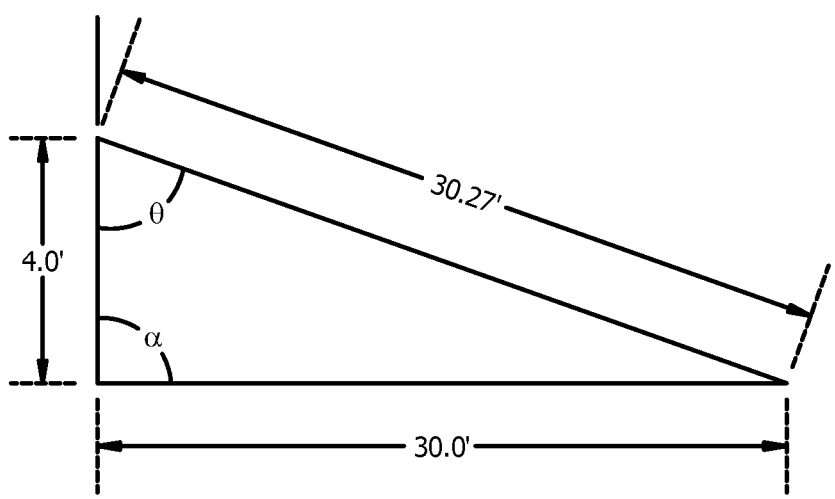
FIG. 5B is a diagram of a light source illumination path according to an operating condition of an embodiment of the present dynamic cycle light distribution system.

Note that the lean angle of the cycle effectively changes the illumination angle of the various LEDs. For example, in a three forward directed LED configuration, on a right turn causing increased lean to the right of the cycle, the illumination angle of the LEDs changes because of the change of the relevant position of the LED and the path of interest during the turn. Thus, the positioning of the LEDs and corresponding angle of illumination are effectively altered during a turn. Accordingly, the percentages at which the LEDs are driven are a function of this altered positioning. This is shown in FIGS. 5A-5I. In FIGS. 5A and 5B, the rider's zenith angle α is approximately 90 degrees (flat surface) and the lean angle μ is approximately zero, meaning the cycle's lateral position is perpendicular in relation to the ground surface along the x-axis. The LEDs are configured to illuminate 30 feet ahead, with an LED illumination angle Θ of 82.5 degrees.

Figure 5C:
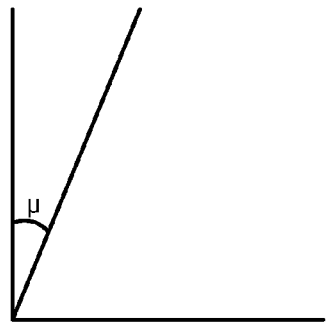
FIG. 5C is a diagram of a light source illumination path according to an operating condition of an embodiment of the present dynamic cycle light distribution system.
Figure 5D:
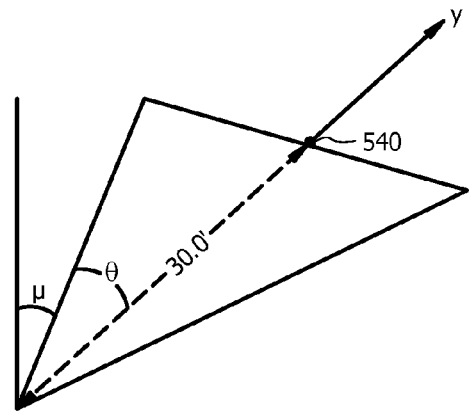
FIG. 5D is a diagram of a light source illumination path according to an operating condition of an embodiment of the present dynamic cycle light distribution system.

In FIG. 5C, a lean angle μ to the right of 25 degrees is assumed with no cycle motion. In FIG. 5D, when the bicycle leans, the axis of rotation is parallel and at the surface of travel, thus, in a normal light the placement of illumination remains the same as if the cycle was upright as shown in FIG. 5A. The point of illumination 540 is 30 feet ahead of the cycle and the 82.5-degree angle of illumination Θ remains the same.

Figure 5E:
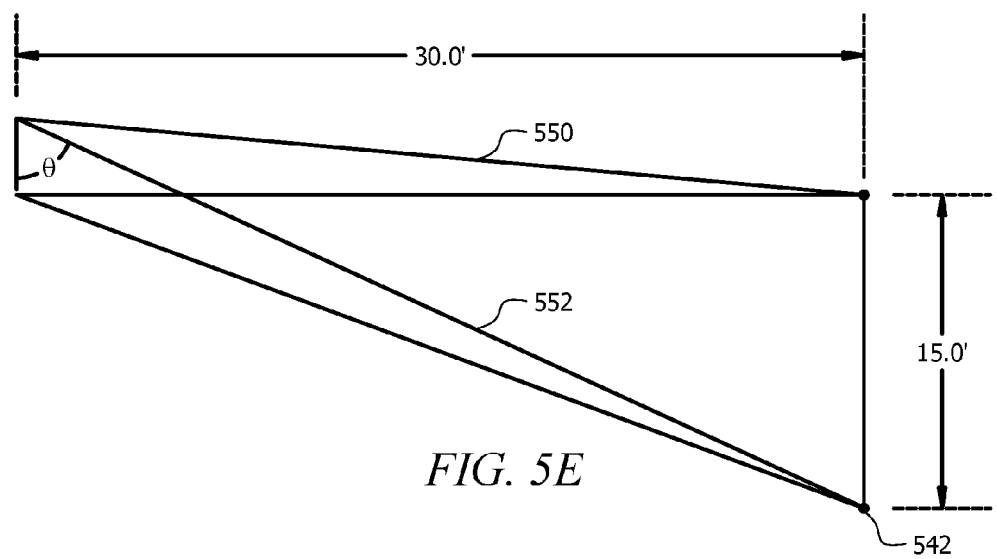
FIG. 5E is a diagram of a light source illumination path according to an operating condition of an embodiment of the present dynamic cycle light distribution system.
Figure 5F:
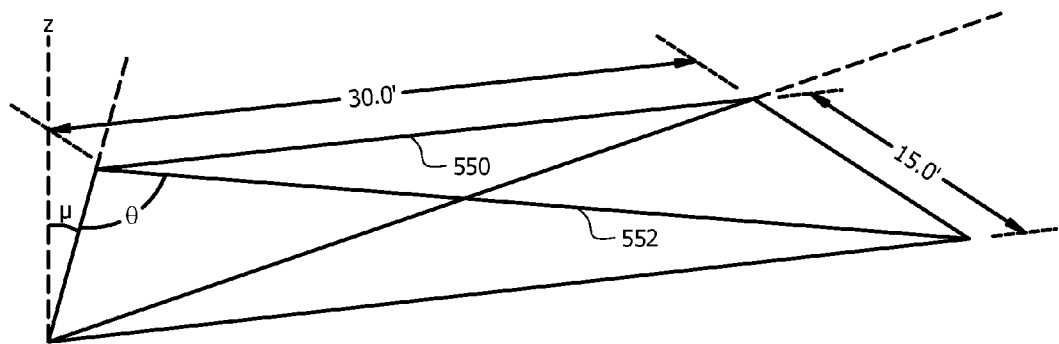
FIG. 5F is a diagram of a light source illumination path according to an operating condition of an embodiment of the present dynamic cycle light distribution system.

As shown in FIGS. 5E and 5F, however, as a cyclist is in motion and turning causing the 25-degree lean angle μ (FIG. 5F), the point of illumination 542 is now 30 feet ahead and 15 feet to the right of the cyclist. In other words, with the turn of the bicyclist the lights change their direction of illumination, thus shifting the illumination point in the direction of the turn. As seen in FIGS. 5E and 5F, an adjusted line of illumination 552 progresses from an original line of illumination 550 according to the change in lean angle and motion of the bicycle. The angle of illumination Θ is 82 degrees.

Figure 5G:
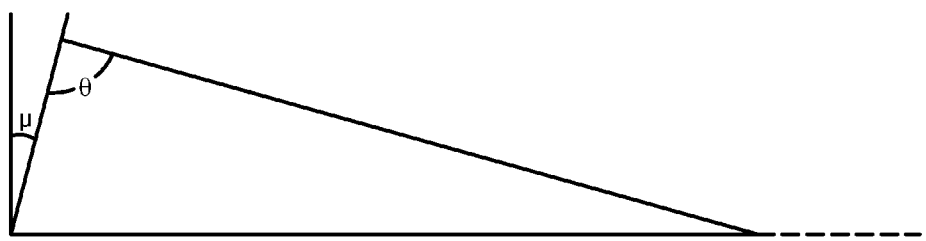
FIG. 5G is a diagram of a light source illumination path according to an operating condition of an embodiment of the present dynamic cycle light distribution system.
Figure 5H:
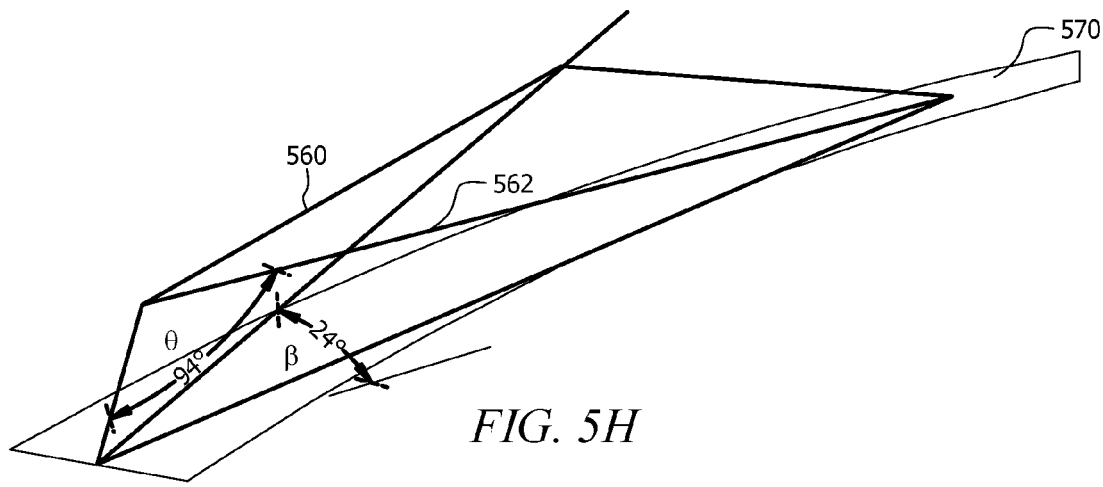
FIG. 5H is a diagram of a light source illumination path according to an operating condition of an embodiment of the present dynamic cycle light distribution system.
Figure 5I:
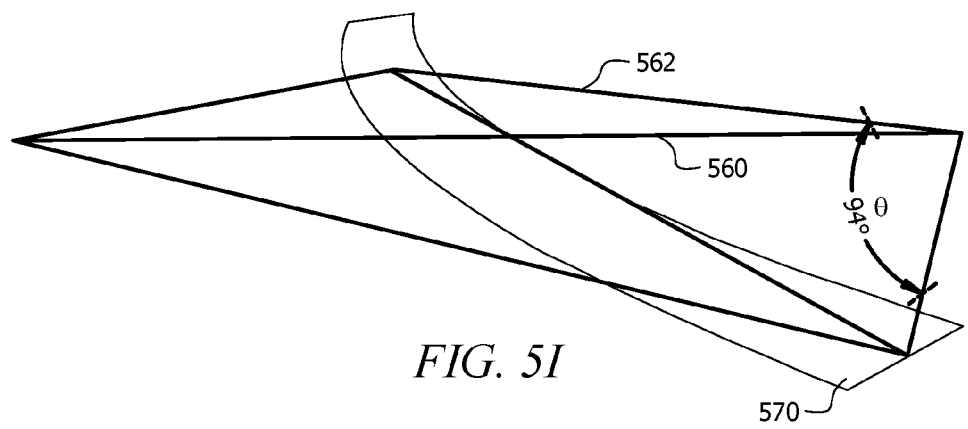
FIG. 5I is a diagram of a light source illumination path according to an operating condition of an embodiment of the present dynamic cycle light distribution system.

FIG. 5G shows the illumination angle Θ=94 degrees and distances from behind the rider at a lean angle μ of 25 degrees. FIGS. 5H and 5I show the relative illumination angles Θ and β in which the lights must be directed to accommodate the turning direction of the bicycle along turning path 570. In FIGS. 5H and 5I, the vertical angle of the light source Θ has shifted to 94 degrees and the relative horizontal angle β is 24 degrees to illuminate the area of interest based on the 25 degree lean angle μ of the bicycle in motion. As shown, an adjusted line of illumination 562 progresses from an original line of illumination 560 according to the change in lean angle and motion of the bicycle along path 570. According to the effective change in positioning of the LED and change in illumination during a turn, the disclosed system adjusts the power distributed to the various LEDs to accommodate these positional changes, resulting in a modified net luminous beam as the position conditions of the bicycle change. This is example is intended to represent the behavior and not exact measurements, directional shifts could occur depending on the aforementioned criteria.

In yet another example, controller 102 may receive signals indicative of steep terrain during a cyclist's descent of a hill. Controller 102 may receive appropriate signals from accelerometer/gyroscope 110 indicative of a severe zenith angle commensurate with downhill travel. Controller 102 may also receive data from speedometer 112 indicating the rate of speed. In addition, controller 102 may receive data from GPS device 108 indicating rate of speed, velocity, heading, or indicating that the cyclist is traversing mountainous terrain. The combination of this information is processed according to computer readable instructions associated with controller. According to this information, controller 102 drives relevant LEDs in a manner described above.

Figure 4:
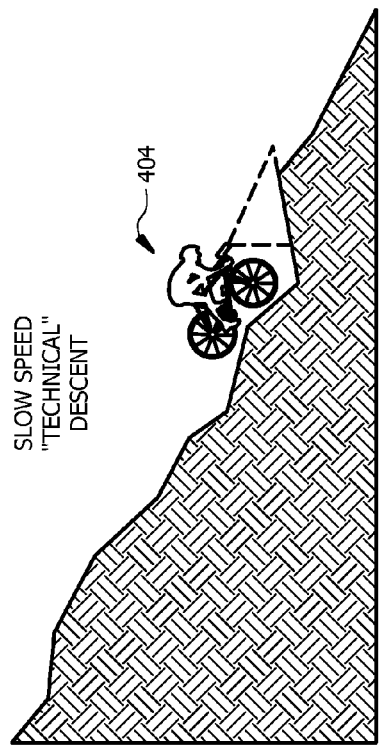
FIG. 4 is a diagram of an embodiment of the operation of the present dynamic cycle light distribution system.
Figure 4:
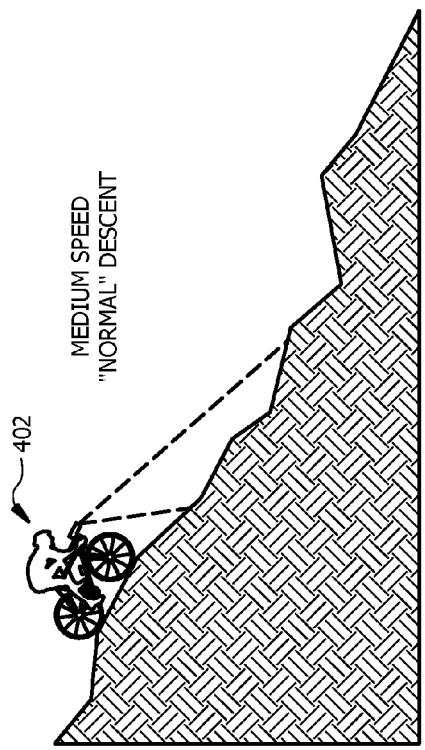

As shown in FIG. 4, two cyclists are descending a hill having irregular terrain at different speeds. The first cyclist 402 is descending a hill at moderate or normal speed. As such, a LED or multiple LEDs are powered in a distributed manner to illuminate an area sufficiently ahead of the cyclist according to the speed, zenith angle and terrain condition. By example, intermediate LED 118 and advanced LED 120 depicted in FIG. 2 may be driven in tandem and in some combination based on the cyclist location, speed and conditions.

Similarly, a second cyclist 404 is descending a hill at slower speed in what may be termed a "technical descent". In this context, illumination in close proximity to the cyclist 404 is necessary to provide immediate awareness of path and obstacle location. Accordingly, only a single LED (such as LED 116 described in FIG. 2) or a second LED (such as intermediate LED 118 of FIG. 2) may be driven to illuminate largely the area in close proximity to the cyclist.

In addition, the controller may drive the LEDs according to instructions entered by a user via interface 114. For example, a user may opt to illuminate a path in a manner typical for high speeds even though the cycle is travelling at slow speed. In addition, the user may wish to activate only downward facing LEDs or LEDs situation at a lower portion of the cycle frame if light is needed close to the ground in the event of searching for a lost item or making a repair. Similarly, a rider may wish to activate a flicker feature when in heavy traffic to make the cyclist more visible to other vehicle operators. This feature would cause designated LEDs to be driven at a lower frequency, causing a discernible on and off condition of the LEDs.

The previously described embodiments are illustrative and are not intended to limit the scope of the invention. In particular, any number of LEDs or light sources may be positioned on a vehicle and a processor may have various program instructions associated therewith to optimize light source activation according to a plethora of conditions.

Additional modifications or enhancements of the present invention may also be apparent to those of ordinary skill in the art. Thus, the particular combination of components described and photographs herein are intended to represent only certain embodiments of the present invention, and are not intended to serve as limitations of alternative debris guards and methods within the spirit and scope of the invention.

ADDITIONAL DISCLOSURE

The following clauses are offered as further description of the disclosed invention.

Clause 1. A dynamic bicycle light power distribution system for adjusting illumination of a plurality of light sources, comprising:
a first light source positioned to illuminate a first area of a path of travel of a bicycle;
a second light source positioned to illuminate a second area of the path of travel of the bicycle remote from the first area;
a position module for transmitting signals representing an operating condition data of the bicycle; and
a controller configured to distribute power to the first light source and the second light source in response to signals received by the position module according to operating conditions of the bicycle.

Clause 2. The system of any of the proceeding or preceding clauses, wherein the operating condition data of the bicycle comprises at least one indicia of a speed, an angle of descent, an angle of incline, a lean angle, a geographic location, and a terrain type.

Clause 3. The system of any of the proceeding or preceding clauses, wherein the controller is configured to distribute power to only the first light source in response to signals received by the position module according to a first operating condition of the bicycle.

Clause 4. The system of any of the proceeding or preceding clauses, wherein the controller is configured to distribute power to only the second light source in response to signals received by the position module according to a second operating condition of the bicycle.

Clause 5. The system of any of the proceeding or preceding clauses, further comprising a third light source positioned to illuminate a third area of the path of travel of the bicycle remote from the first area and the second area.

Clause 6. The system of any of the proceeding or preceding clauses, wherein the controller is configured to distribute power to only the second light source and the third light source in response to signals received by the position module according to a third operating condition of the bicycle.

Clause 7. The system of any of the proceeding or preceding clauses, wherein the controller is configured to distribute power to only the third light source in response to signals received by the position module according to a fourth operating condition of the bicycle.

Clause 8. The system of any of the proceeding or preceding clauses, wherein the light source comprises a light emitting diode.

Clause 9. The system of any of the proceeding or preceding clauses, wherein the operating condition data of the bicycle comprises speed, angle of descent, angle of incline, lean angle, geographic location, and terrain type.

Clause 10. The system of any of the proceeding or preceding clauses, wherein the controller is configured to distribute power to the first light source and the second light source in response to signals received by the position module according to a fifth operating condition of the bicycle.

Clause 11. The system of any of the proceeding or preceding clauses, wherein the controller is further configured to distribute power to the second light source and the third light source in response to signals received by the position module according to the fifth operating condition of the bicycle.

Clause 12. The system of any of the proceeding or preceding clauses, wherein the controller further comprises pulse width modulation circuitry to distribute power to the first light source, the second light source and the third light source.

Clause 13. The system of any of the proceeding or preceding clauses, wherein the controller is further configured to distribute a level of power to the first light source that is greater than a level of power distributed to the second light source according to the fifth operating condition of the bicycle.

Clause 14. The system of any of the proceeding or preceding clauses, wherein the controller is further configured to distribute a level of power to the second light source that is greater than a level of power distributed to the third light source according to the fifth operating condition of the bicycle.

Clause 15. The system of any of the proceeding or preceding clauses, wherein the controller is further configured to distribute a level of power to the first light source that is less than a level of power distributed to the second light source according to the fifth operating condition of the bicycle.

Clause 16. The system of any of the proceeding or preceding clauses, wherein the controller is further configured to distribute a level of power to the second light source that is less than a level of power distributed to the third light source according to the fifth operating condition of the bicycle.

Clause 17. The system of any of the proceeding or preceding clauses, wherein the fifth operating condition is a decreased angle of incline.

Clause 18. The system of any of the proceeding or preceding clauses, wherein the fifth operating condition is an increased angle of incline.

Clause 19. The system of any of the proceeding or preceding clauses, wherein the fifth operating condition is an increased rate of speed.

Clause 20. The system of any of the preceding clauses, wherein the fifth operating condition is a decreased rate of speed.

I claim:
1. A dynamic vehicle light power distribution system for adjusting illumination of a plurality of light sources, comprising:
a first light source positioned to illuminate a first area of a path of travel of a vehicle;

a second light source positioned to illuminate a second area of the path of travel of the vehicle at least partially spatially separated from the first area;

a position module for transmitting signals representing an operating condition data of the vehicle; and a controller configured to distribute power to the first light source and the second light source in response to signals received by the position module according to operating conditions of the vehicle, wherein the controller is further configured to distribute a level of power to the first light source that is greater than a level of power distributed to the second light source according to the operating conditions of the vehicle, wherein the vehicle comprises at least two wheels.

2. The system of claim 1, wherein the operating condition data of the vehicle comprises at least one indicia of a speed, an angle of descent, an angle of incline, a lean angle, a geographic location, and a terrain type.

3. The system of claim 1, wherein the controller is configured to distribute power to only the first light source in response to signals received by the position module according to the operating conditions of the vehicle.

4. The system of claim 1, further comprising a third light source positioned to illuminate a third area of the path of travel of the vehicle at least partially spatially separated from the first area and the second area.

5. The system of claim 4, wherein the operating condition data of the vehicle comprises speed, angle of descent, angle of incline, lean angle, geographic location, and terrain type.

6. The system of claim 4, wherein the controller is further configured to distribute power to the second light source and the third light source in response to signals received by the position module according to the operating conditions of the vehicle.

7. The system of claim 6, wherein the controller is further configured to distribute a level of power to the second light source that is greater than a level of power distributed to the third light source according to the operating conditions of the vehicle.

8. The system of claim 4, wherein the controller further comprises pulse width modulation circuitry to distribute power to the first light source, the second light source and the third light source.

9. The system of claim 1, wherein the light source comprises a light emitting diode.

10. A dynamic vehicle light power distribution system for adjusting illumination of a plurality of light sources, comprising:

a first light source positioned to illuminate a first area of a path of travel of a vehicle;

a second light source positioned to illuminate a second area of the path of travel of the vehicle at least partially spatially separated from the first area;

a position module for transmitting signals representing an operating condition data of the vehicle; and a controller configured to distribute power to the first light source and the second light source in response to signals received by the position module according to operating conditions of the vehicle, wherein the controller is further configured to distribute a level of power to the first light source that is less than a level of power distributed to the second light source according to the operating conditions of the vehicle, wherein the vehicle comprises at least two wheels.

11. The system of claim 10, wherein the controller is configured to distribute power to only the second light source in response to signals received by the position module according to the operating conditions of the vehicle.

12. The system of claim 10, wherein the operating condition is a decreased angle of incline.

13. The system of claim 10, wherein the operating condition is an increased angle of incline.

14. The system of claim 10, wherein the operating condition is an increased rate of speed.

15. The system of claim 10, wherein the operating condition is a decreased rate of speed.

16. The system of claim 10, wherein the operating condition data of the vehicle comprises at least one indicia of a speed, an angle of descent, an angle of incline, a lean angle, a geographic location, and a terrain type.

17. The system of claim 10, wherein the controller is configured to distribute power to only the second light source in response to signals received by the position module according to the operating conditions of the vehicle.

18. The system of claim 10, further comprising a third light source positioned to illuminate a third area of the path of travel of the vehicle at least partially spatially separated from the first area and the second area.

19. The system of claim 18, wherein the controller is further configured to distribute a level of power to the second light source that is less than a level of power distributed to the third light source according to the operating conditions of the vehicle.

20. The system of claim 18, wherein the controller is configured to distribute power to the second light source and the third light source in response to signals received by the position module according to the operating conditions of the vehicle.

21. The system of claim 18, wherein the operating condition data of the vehicle comprises speed, angle of descent, angle of incline, lean angle, geographic location, and terrain type.

22. The system of claim 18, wherein the controller further comprises pulse width modulation circuitry to distribute power to the first light source, the second light source and the third light source.

23. The system of claim 10, wherein the light source comprises a light emitting diode.

* * * * *